United States Patent
Gilbert

(10) Patent No.: US 8,160,875 B2
(45) Date of Patent: *Apr. 17, 2012

(54) SYSTEM AND METHOD FOR IMPROVING ROBUSTNESS OF SPEECH RECOGNITION USING VOCAL TRACT LENGTH NORMALIZATION CODEBOOKS

(75) Inventor: Mazin Gilbert, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/869,039

(22) Filed: Aug. 26, 2010

(65) Prior Publication Data

US 2010/0324893 A1 Dec. 23, 2010

Related U.S. Application Data

(63) Continuation of application No. 11/765,527, filed on Jun. 20, 2007, now Pat. No. 7,797,158.

(51) Int. Cl.
*G10L 15/06* (2006.01)
(52) U.S. Cl. .............. 704/234; 704/245; 704/222
(58) Field of Classification Search ............ 704/200–278
See application file for complete search history.

(56) References Cited

U.S. PATENT DOCUMENTS

| 5,150,449 | A  |   | 9/1992  | Yoshida et al.             |
|-----------|----|---|---------|----------------------------|
| 5,729,694 | A  | * | 3/1998  | Holzrichter et al. ... 705/17 |
| 5,895,447 | A  | * | 4/1999  | Ittycheriah et al. ... 704/231 |
| 5,983,178 | A  | * | 11/1999 | Naito et al. ... 704/245    |
| 6,073,101 | A  | * | 6/2000  | Maes ... 704/275           |
| 6,081,660 | A  |   | 6/2000  | Macleod et al.             |
| 6,182,037 | B1 | * | 1/2001  | Maes ... 704/247           |
| 6,502,070 | B1 |   | 12/2002 | Boies et al.               |
| 6,529,871 | B1 | * | 3/2003  | Kanevsky et al. ... 704/246 |
| 7,567,903 | B1 |   | 7/2009  | Goffin et al.              |
| 2005/0038655 | A1 |   | 2/2005  | Mutel et al.               |
| 2006/0229875 | A1 |   | 10/2006 | Acero et al.               |

\* cited by examiner

*Primary Examiner* — Abul Azad

(57) ABSTRACT

Disclosed are systems, methods, and computer readable media for performing speech recognition. The method embodiment comprises selecting a codebook from a plurality of codebooks with a minimal acoustic distance to a received speech sample, the plurality of codebooks generated by a process of (a) computing a vocal tract length for a each of a plurality of speakers, (b) for each of the plurality of speakers, clustering speech vectors, and (c) creating a codebook for each speaker, the codebook containing entries for the respective speaker's vocal tract length, speech vectors, and an optional vector weight for each speech vector, (2) applying the respective vocal tract length associated with the selected codebook to normalize the received speech sample for use in speech recognition, and (3) recognizing the received speech sample based on the respective vocal tract length associated with the selected codebook.

20 Claims, 2 Drawing Sheets

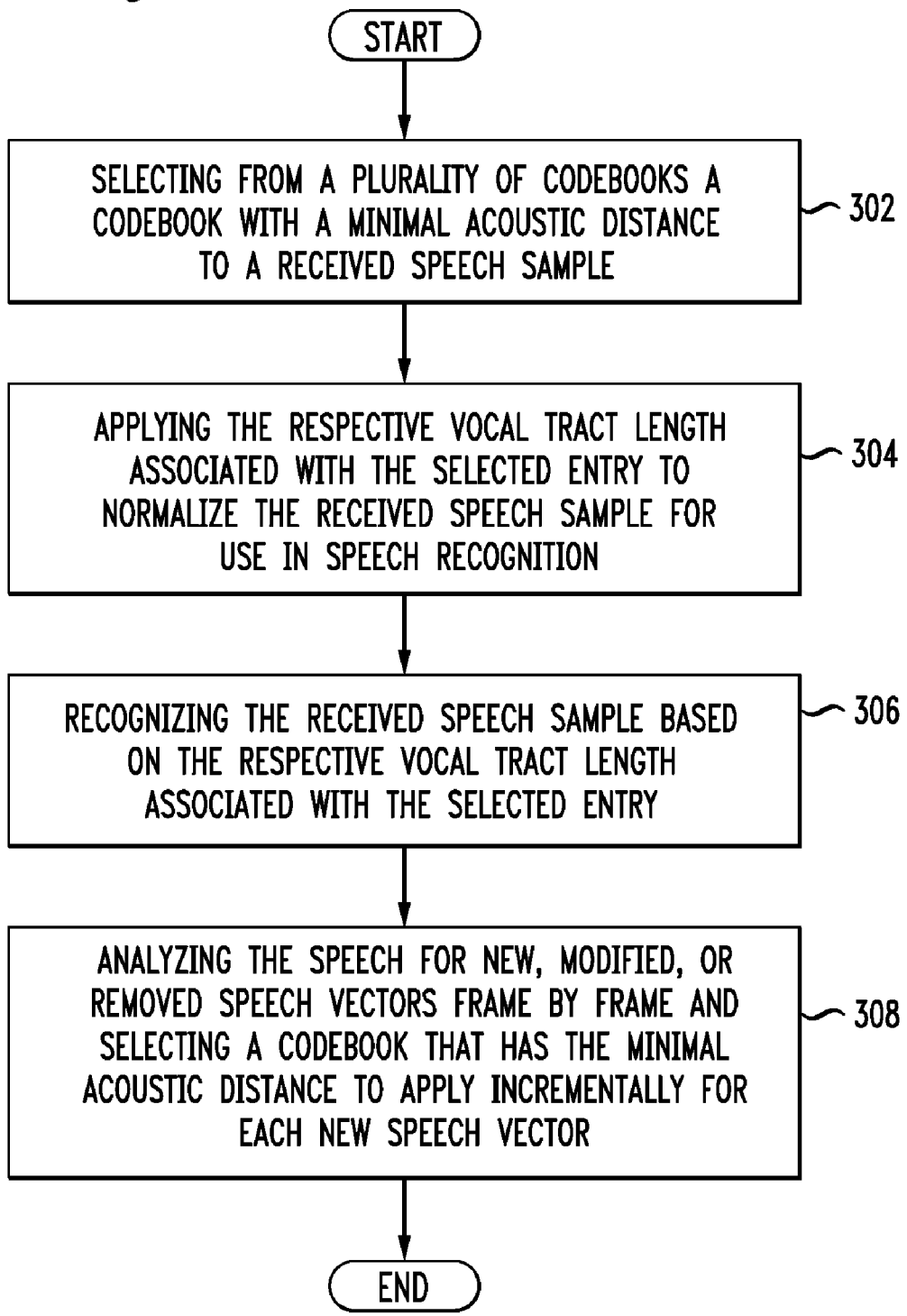

SYSTEM AND METHOD FOR IMPROVING ROBUSTNESS OF SPEECH RECOGNITION USING VOCAL TRACT LENGTH NORMALIZATION CODEBOOKS

PRIORITY INFORMATION

The present application is a continuation of U.S. patent application Ser. No. 11/765,527, filed Jun. 20, 2007, the content of which is included herewith in its entirety.

BACKGROUND OF THE INVENTION

1. Field of the Invention

The present invention relates generally to speech recognition and more specifically to performing speech recognition based on precomputed speaker normalization factors stored in codebooks.

2. Introduction

Currently, sensitivity to variable background environments, accents, dialects, speaker characteristics, channel environments, and recording conditions is a challenge to speech recognition systems. Such variables in combination with noisy conditions often cause the quality of speech recognition systems to deteriorate so far as to be unusable for certain applications. Speech recognition systems can be aided by normalizing speech, a process of estimating the vocal tract length of a speaker and adjusting the speech recognition based on the vocal tract length. State of the art methods require a minimum of 10 to 20 seconds to successfully normalize the speech. This minimum requirement makes such systems impractical in certain situations, for example, voice-enabled dialog systems where only 2 to 4 seconds of speech may be available. Accordingly, what is needed in the art is faster, more robust method for calculating vocal tract length in order to normalize a speech sample.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and computer readable media for normalizing a received speech sample at run time for use in speech recognition, comprising the steps of (1) selecting a codebook from a plurality of codebooks with a minimal acoustic distance to a received speech sample, the plurality of codebooks generated by a process of: (a) computing a vocal tract length for a each of a plurality of speakers, (b) for each of the plurality of speakers, clustering speech vectors, and (c) creating a codebook for each speaker, the codebook containing entries for the respective speaker's vocal tract length, speech vectors, and an optional vector weight for each speech vector, (2) applying the respective vocal tract length associated with the selected codebook to normalize the received speech sample for use in speech recognition; and (3) recognizing the received speech sample based on the respective vocal tract length associated with the selected codebook.

The principles of this invention may be utilized to reduce dependency on test data by relying on codebooks instead of reference acoustic models to compute the speaker normalization factor when estimating vocal tract length. The principles of this invention may also enable local normalization of the vocal tract length as opposed to traditional approaches of batch normalization.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
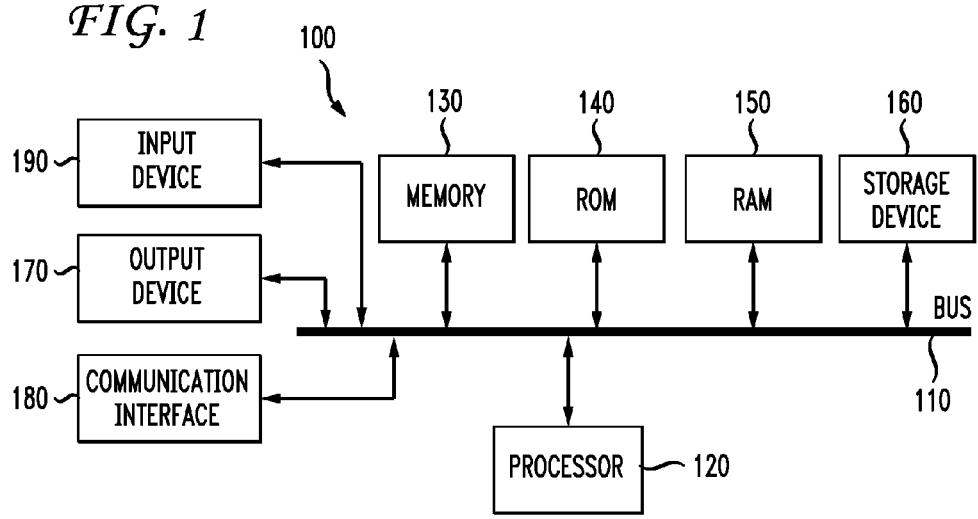
FIG. 1 illustrates a basic system or computing device embodiment of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

As an introductory matter, vocal tract length is closely tied to the normalization factor. In order for speech recognition systems to perform their function properly, speech is normalized to a standard of 1, which is not representative of any particular individual. Rather, the speech normalization standard is intended to represent a mid-point between the maximum and minimum lengths of human vocal cords, or roughly 12.5 mm to 25 mm in length. The ideal vocal tract length is has a normalization factor of 1. Actual human speech is normalized by multiplying the vocal tract length by factors ranging from about 0.8 to about 1.2 to approximate the ideal vocal tract length. That is, a long vocal tract length would be normalized by multiplying by a number closer to 0.8, and a short vocal tract length would be normalized by multiplying by a number closer to 1.2. Speech normalization makes the speech more consistent between vocal tract length differences, and therefore easier for automated speech recognition systems to comprehend.

Figure 2:
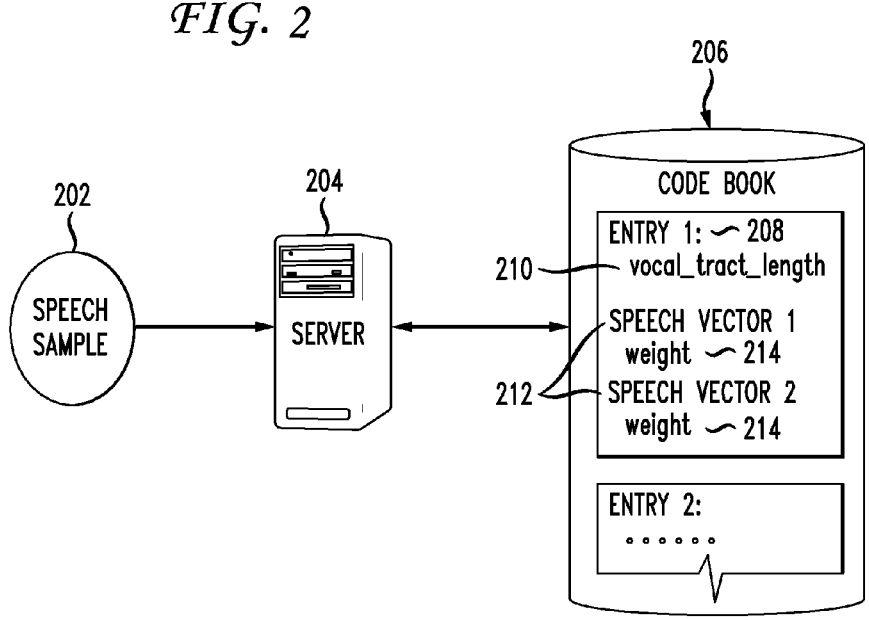
FIG. 2 illustrates an example system for normalizing a given speech sample for use in speech recognition.

The present invention relates to estimating the normalized speakers' vocal tract lengths by using codebooks. One preferred example and an application in which the invention may be applied is a voice-enabled dialog system, for example, a phone directory menu system. FIG. 2 illustrates a basic example of how a voice-enabled dialog system might work.

As a first step of the system, codebooks of one or more speech normalization factors must be generated. The codebooks are populated by computing a vocal tract length for a each of a plurality of speakers, for each of the plurality of speakers, clustering speech vectors, and creating a codebook for each speaker, the codebook containing entries for the respective speaker's vocal tract length, speech vectors, and an optional vector weight for each speech vector. This codebook generation is generally called the training phase because it populates the codebooks with speech samples to compare to later speech samples and normalize the later speech samples. This codebook generation process would be more effective when multiple speech samples are drawn from, but it is not strictly required.

If the codebooks are to be trained to be versatile, selected speakers should have different speaking styles and/or speaking characteristics. A group of speakers with a variety of dialects or accents, for example speakers from Brooklyn, Louisiana, Iowa, and Oregon, is preferable to a group from only one dialect or accent, which could skew the codebooks in favor of that locale. Likewise, a group composed of old, young, smokers, nonsmokers, male, female, and multi-racial speakers is preferable to a group that does not adequately represent varying accents, dialects, and/or speaker characteristics. If the codebooks are to be trained to cater to a specific group, such as Japanese tourists who speak broken English, then speakers should be selected that reflect the specific group.

Each final, populated codebook should be created for each speaker and include an entry containing the vocal tract length, at least one speech vector, and/or optional weight of each speech vector.

After the codebooks are generated, a speech sample 202 may be transmitted to the server 204. The server analyzes the speech sample in order to select an entry 208 from the codebook 206 which has the minimal acoustic distance to the speech sample. The codebook is selected from the plurality of populated codebooks. The acoustic distance calculation could be a likelihood computation. The appropriate vocal tract length 210 is selected and used to normalize the speech sample. Corresponding speech vectors 212 may also be used to normalize the speech. Each speech vector may have an optional weight 214 to indicate the strengths of the component vectors. The weight indicates how strong the speech vector is and how much influence may be given to the speech vector when normalizing speech.

Some advantages of this approach are reduced computational time and reduced minimal speech sample length. The time required to look up a corresponding entry in a codebook is much shorter than the time required to sample and calculate the vocal tract length of a speaker adequately. Once the speech normalization factor is selected and applied, speech recognition can be performed by any means.

If the speaker changes, the received voice signal may also significantly change. For each additional speaker, new codebooks may be selected for use in speech recognition. For example, if a grandfather is speaking on the phone and hands the receiver to his 9-year-old granddaughter, the speech normalization factor is no longer relevant or optimal. A sudden change to a vastly different voice could require a fresh selection of a new codebook to adequately handle the voice during speech recognition.

The speaker may remain constant in the course of a conversation, but certain characteristics of the speech may change over time. Speech vectors may be changed, added, or taken away, necessitating selecting a new speech normalization factor frame by frame. As an example, if the speaker has a sore throat, speech characteristics can progressively get rougher and rougher. As another example, if a speaker is inside and suddenly moves outside on a windy day, the speaker may begin to speak louder or faster as the environment changes. At some statically or dynamically determined frame, speech could be reviewed to find the speech normalization factor with the minimal acoustic distance. Frames could be a set time, such as every 5 seconds. Frames could also be set dynamically, for example frames being set by every pause in speech that lasts at least 750 milliseconds. This is a more gradual, adaptive approach as opposed to the previous paragraph's approach of selecting a new codebook when a speech vector changes suddenly.

FIG. 3 illustrates an exemplary method embodiment of performing speech recognition. First, the method comprises selecting from a plurality of codebooks a codebook with a minimal acoustic distance to a received speech sample, the plurality of codebooks generated by a process of: (a) computing a vocal tract length for a each of a plurality of speakers, (b) for each speaker of the plurality of speakers, clustering speech vectors of that speaker's speech samples, and (c) creating a codebook for each respective speaker, the codebook containing the respective vocal tract length, speech vectors, and an optional weight for each speech vector (302). Second, the method comprises applying the respective vocal tract length associated with the selected entry to normalize the received speech sample for use in speech recognition (304). Third, the method comprises recognizing the received speech sample based on the respective vocal tract length associated with the selected entry (306). Fourth, at each frame boundary, whether dynamically or statically determined, analyze the speech for new, modified, or removed speech vectors, and select a codebook that has the minimal acoustic distance to apply incrementally for each new speech vector (308). Frames may be dynamically determined by factors like detected pauses in speech or frames may be statically determined, like every 10 seconds or any other reasonable time frame.

This method could be used to assist other speech recognition methods known in the art. Known methods typically require a minimum of 10 to 20 seconds to compute vocal tract length. This codebook-based method could be used to estimate an initial value for a vocal tract length while known, slower methods are used to calculate a second value for a vocal tract length. In the intermediate time between receiving the first and second vocal tract lengths, the first estimated vocal tract length could be used. Then the more optimal of the first estimated vocal tract length and the second calculated vocal tract length, the average of the two, or any point between the two values, if either value has additional weight based on a level of certainty or other factors, could be applied for use in speech recognition.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, this codebook-based approach could be used in voice-controlled IPTV situations where users speak into a microphone or similar device to change channels, pause, rewind, or otherwise control the viewing experience where users typically provide less than 10-20 seconds of speech with which to calculate vocal tract length and normalize the speech using known systems in the art. Accordingly, the appended claims and their legal equivalents should only define the invention, rather than any specific examples given.

I claim:

1. A method of performing speech recognition, the method comprising:
    selecting a codebook, from a plurality of codebooks, indicating an initial vocal tract length based on an acoustic distance to a received speech, wherein the plurality of codebooks comprises codebooks for each of a plurality of speakers and is generated based on a respective vocal tract length for each of the plurality of speakers;
    initiating a computation of a computed vocal tract length from the received speech;
    normalizing the received speech based on at least one of the initial vocal tract length and the computed vocal tract length to yield a normalized received speech; and
    recognizing the normalized received speech, wherein the recognizing uses normalized received speech that is normalized using the initial vocal tract length until the computation of the computed vocal tract length is complete.

2. The method of claim 1, further comprising:
    identifying an additional speech vector in the received speech; and
    selecting an additional codebook indicating an additional vocal tract length from the plurality of codebooks based on the additional speech vector.

3. The method of claim 2, further comprising:
normalizing the received speech based at least on the additional vocal tract length to yield additional normalized received speech; and
recognizing the additional normalized received speech.

4. The method of claim 1, wherein the method is performed frame by frame.

5. The method of claim 1, wherein recognizing the normalized received speech occurs in real time.

6. The method of claim 1, wherein the plurality of codebooks covers vocal tract lengths from approximately 0.8 to 1.2 times an ideal vocal tract length.

7. The method of claim 1, wherein selecting the codebook from the plurality of codebooks is based on a likelihood calculation.

8. A system for performing speech recognition, the system comprising:
a processor;
a first module configured to control the processor to select a codebook, from a plurality of codebooks, indicating an initial vocal tract length based on an acoustic distance to a received speech, wherein the plurality of codebooks comprises codebooks for each of a plurality of speakers and is generated based on a respective vocal tract length for each of the plurality of speakers;
a second module configured to control the processor to initiate a computation of a computed vocal tract length from the received speech;
a third module configured to control the processor to normalize the received speech based on at least the initial vocal tract length and the computed vocal tract length to yield a normalized received speech; and
a fourth module configured to control the processor to recognize the normalized received speech, wherein the recognizing uses normalized received speech that is normalized using the initial vocal tract length until the computation of the computed vocal tract length is complete.

9. The system of claim 8, further comprising:
a fifth module configured to control the processor to identify an additional speech vector in the received speech; and
a sixth module configured to control the processor to select an additional codebook indicating an additional vocal tract length from the plurality of codebooks based on the additional speech vector.

10. The system of claim 9, further comprising:
a seventh module configured to control the processor to normalize the received speech based at least on the additional vocal tract length to yield additional normalized received speech; and
a seventh module configured to control the processor to recognize the additional normalized received speech.

11. The system of claim 8, wherein the system operates frame by frame.

12. The system of claim 8, wherein the fourth module is further configured to control the processor to recognize the normalized received speech in real time.

13. The system of claim 8, wherein the plurality of codebooks covers vocal tract lengths from approximately 0.8 to 1.2 times an ideal vocal tract length.

14. The system of claim 8, wherein the first module is further configured to control the processor to select the codebook from the plurality of codebooks based on a likelihood calculation.

15. A non-transitory computer-readable storage medium storing instructions which, when executed by a computing device, cause the computing device to perform speech recognition, the instructions comprising:
selecting a codebook, from a plurality of codebooks, indicating an initial vocal tract length based on an acoustic distance to a received speech, wherein the plurality of codebooks comprises codebooks for each of a plurality of speakers and is generated based on a respective vocal tract length for each of the plurality of speakers;
initiating a computation of a computed vocal tract length from the received speech;
normalizing the received speech based on at least one of the initial vocal tract length and the computed vocal tract length to yield a normalized received speech; and
recognizing the normalized received speech, wherein the recognizing uses normalized received speech that is normalized using the initial vocal tract length until the computation of the computed vocal tract length is complete.

16. The non-transitory computer-readable storage medium of claim 15, further comprising:
identifying an additional speech vector in the received speech;
selecting an additional codebook indicating an additional vocal tract length from the plurality of codebooks based on the additional speech vector.

17. The non-transitory computer-readable storage medium of claim 16, further comprising:
normalizing the received speech based at least on the additional vocal tract length to yield additional normalized received speech;
recognizing the additional normalized received speech.

18. The non-transitory computer-readable storage medium of claim 15, wherein recognizing the normalized speech is performed frame by frame.

19. The non-transitory computer-readable storage medium of claim 15, wherein recognizing the normalized received speech occurs in real time.

20. The non-transitory computer-readable storage medium of claim 1, wherein selecting the codebook from the plurality of codebooks is based on a likelihood calculation.

* * * * *